US005299101A

United States Patent [19]

Serizawa

[11] Patent Number: 5,299,101

[45] Date of Patent: Mar. 29, 1994

[54] DISCHARGE-TYPE HEADLAMP HAVING REDUCED GLARE

[75] Inventor: Hiroyuki Serizawa, Shizuoka, Japan

[73] Assignee: Koito Manufacturing Co., Ltd., Tokyo, Japan

[21] Appl. No.: 7,920

[22] Filed: Jan. 22, 1993

[30] Foreign Application Priority Data

Feb. 5, 1992 [JP] Japan .................................... 4-56380

[51] Int. Cl.$^5$ ................................................ B60Q 1/04

[52] U.S. Cl. ....................................... 362/61; 362/263; 362/297; 362/308; 362/309; 362/332; 362/346

[58] Field of Search ............... 362/297, 346, 329, 332, 362/351, 308, 309, 61, 261

[56] References Cited

U.S. PATENT DOCUMENTS 4,208,704 6/1980 Draper .

4,760,501 6/1988 de Vrijer .

4,899,261 2/1990 Blusseau et al. .................... 362/308

4,928,214 5/1990 Oyama ................................. 362/61

FOREIGN PATENT DOCUMENTS 2810670 9/1979 Fed. Rep. of Germany ...... 362/332

711133 9/1931 France ................................ 362/309

*Primary Examiner*—Ira S. Lazarus

*Assistant Examiner*—Sara Sachie Raab

*Attorney, Agent, or Firm*—Sughrue, Mion, Zinn, Macpeak & Seas

[57] ABSTRACT

An automotive headlamp employing a discharge bulb as a light source in which flaring light which could blind the driver of an oncoming vehicle is eliminated and the visibility of objects in the upper part of the road is improved. A reflecting surface of a reflector is divided into a lower reflecting surface and an upper reflecting surface, the lower reflecting surface being a substantially lower half portion that receives a scattered flux attributable to metal halide sediments of a bulb and the upper reflecting surface being a substantially upper half portion that receives a nonscattered flux. The lower reflecting surface is further divided into a right reflecting surface, which is a right half portion thereof, and a left reflecting surface, which is a left half portion thereof. The right and left reflecting surfaces are inclined to predetermined degrees so that reflective fluxes can be inclined in respective left and right directions. Diffusing lens steps are formed within a range of the lower half portion of a front lens that covers a front opening of the reflector, the range allowing the fluxes from the right reflecting surface and the left reflecting surface to pass.

4 Claims, 6 Drawing Sheets

DISCHARGE-TYPE HEADLAMP HAVING REDUCED GLARE

BACKGROUND OF THE INVENTION

The present invention relates to an improved automotive headlamp using a metal halide lamp bulb as a light source.

Automotive headlamps using a metal halide discharge lamp bulb 50 as a light source are known, examples of which are shown in see FIGS. 8(*a*) and 8(*b*). In the metal halide discharge lamp bulb 50 part of the metal halide tends to sediment on the bottom of the discharge lamp bulb (arrow A). The metal halide sediment 51 scatters light, and the scattered light is reflected by the bottom of a reflector 52 (arrow B), producing upward flaring light G1, as shown in light distribution patterns of FIG. 9. This flaring light, that is, the portion of the light distribution attributed to the scattered light, at a portion to the right of a vertical line V and over a horizontal line H can temporarily blind the driver of an oncoming vehicle. On the other hand, the driver of the automobile producing such flaring light cannot see obstacles in the road unless a sufficient amount of light is provided in certain portions of the light distribution. Further, as is apparent from FIG. 9, the automotive headlamp of this type has problems in that the amount of light is so large as to produce flaring light at a portion G2 close to highly intense portions S1 and S2 even in the absence of the flaring light G1 resulting from the halide sediment 51, and in that the amount of light is so small at peripheral portions, such as a portion G3, that visibility for obstacles in the road is low.

Therefore, what has long been desired is an automotive headlamp of a type employing a metal halide discharge lamp bulb which produces no flaring light G1 associated with light scattered by halide sediments and less light distribution at the upper right portion G2 surrounded by the lines V and H, and which provides a certain desired amount of light at the peripheral portion G3.

SUMMARY OF THE INVENTION

The present invention has been made in view of the above problems. Accordingly, an object of the invention is to provide a headlamp for an automobile using a metal halide discharge lamp bulb as a light source which not only can eliminate flaring light posing a danger to oncoming vehicles by providing a preferred light distribution pattern, but also can ensure safer driving by improving visibility for obstacles in the road.

A headlamp for an automobile according to the invention employs a metal halide discharge lamp bulb as a light source provided in front of a reflector. In the headlamp, the mirrored surface of the reflector is divided into a lower reflecting surface and an upper reflecting surface. The lower reflecting surface, which constitutes substantially a lower half portion of the mirrored reflector surface, receives a scattered flux attributable to metal halide sediments in the bulb, whereas the upper reflecting surface, which constitutes substantially an upper half portion of the mirrored reflector surface, receives a nonscattered flux. The lower reflecting surface is further divided into a right reflecting surface including a right half portion of the lower reflecting mirror surface and a left reflecting surface including a left half portion thereof. The right reflecting surface and the left reflecting surface are inclined by predetermined angles so that the respective reflected fluxes are inclined in respective left and right directions. In the inventive headlamp, diffusing lens steps are formed in a certain range of the lower half portion of a front lens covering a front opening of the reflector, the range being such as to cause the fluxes from the right and left reflecting surfaces to be diffused in both right and left directions.

As in conventional headlamps of the same general type, metal halide particles are unavoidably deposited on the bottom of the metal halide discharge lamp bulb after the lamp has been in service for a long time. The scattered flux caused by this sediment is directed onto the lower reflecting surface formed in the lower half of the reflector. The left half portion of this flux may be inclined in the leftward direction by the left reflecting surface, whereas the right half portion is inclined in the rightward direction by the right reflecting surface. Preferably, however, the portion reflected by the left reflecting surface is inclined rightward, whereas the portion reflected by the right reflecting surface is inclined leftward. The thus-inclined fluxes are directed onto the diffusing lens steps of the front lens. Of the flux received by the diffusing lens steps, the upward scattered light is cut off since the flux is diffused in both right and left directions by the diffusing lens steps.

DESCRIPTION OF THE PREFERRED EMBODIMENTS

A headlamp for an automobile constructed in accordance with a preferred embodiment of the invention will be described with reference to FIGS. 1 to 4.

Figure 1:
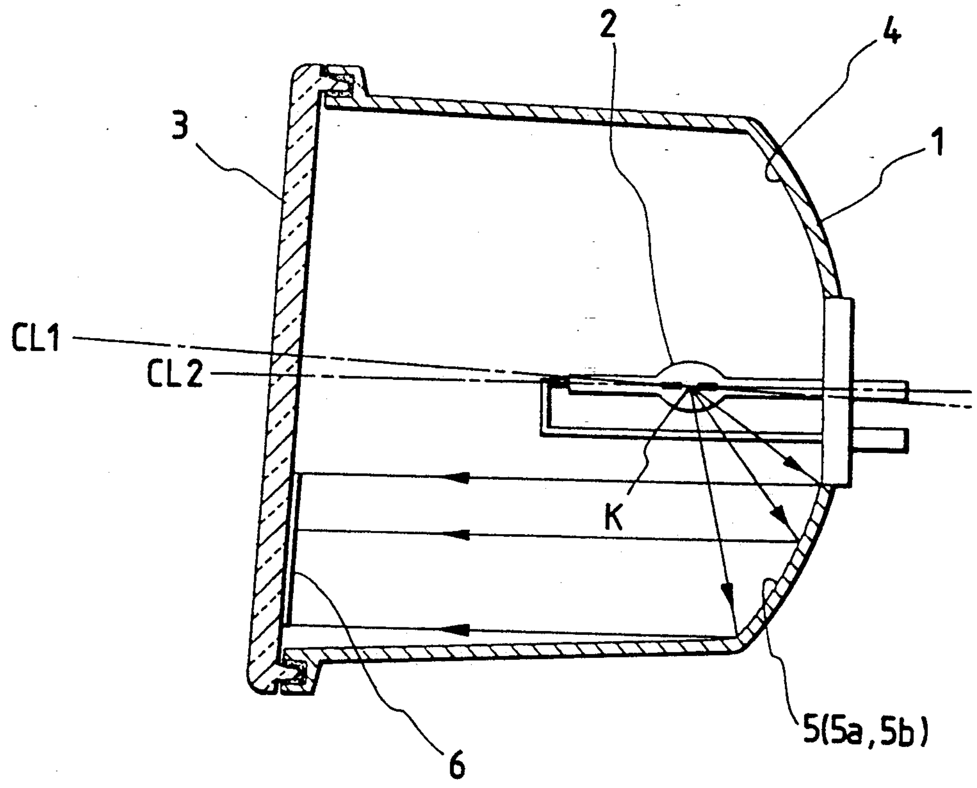
FIG. 1 is a longitudinal sectional view of a headlamp for an automobile constructed in accordance with a preferred embodiment of the invention.
Figure 2:
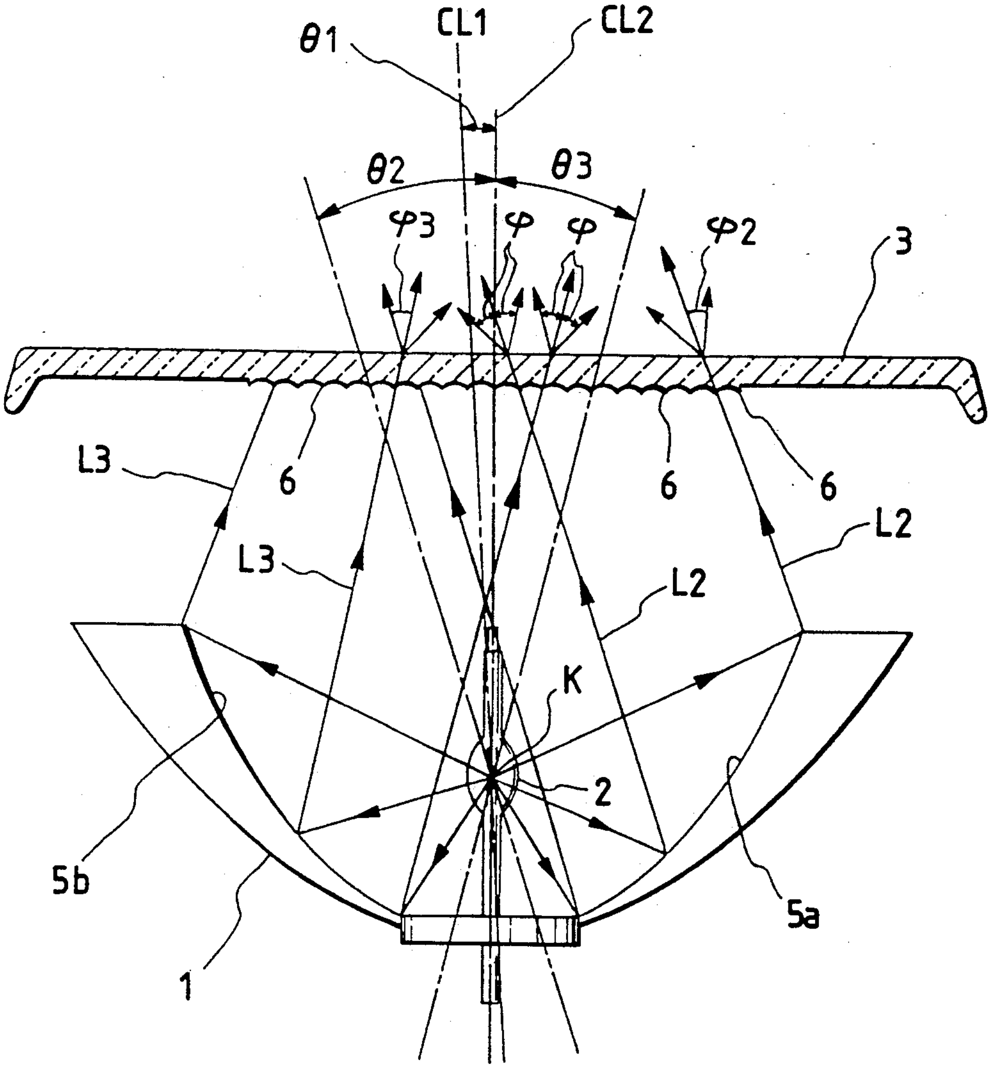
FIG. 2 is a top sectional view of the headlamp of FIG. 1.
Figure 3:
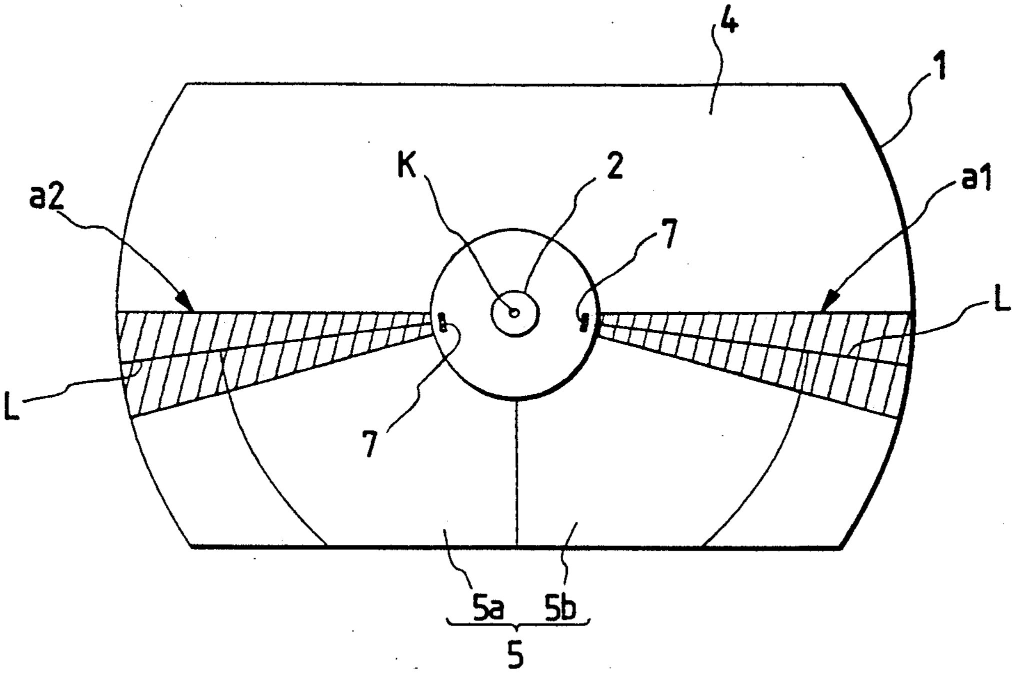
FIG. 3 is a front view in which a front lens is removed from the headlamp.
Figure 4A:
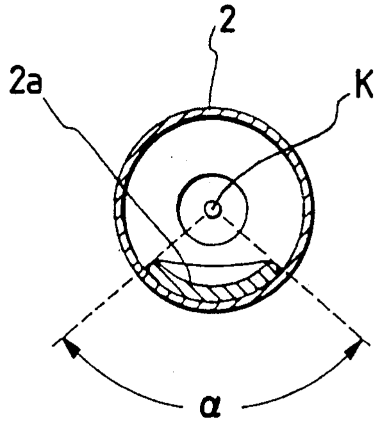
FIGS. 4(*a*) and 4(*b*) are respectively a front sectional view and a side sectional view of a light source of the headlamp.
Figure 4B:
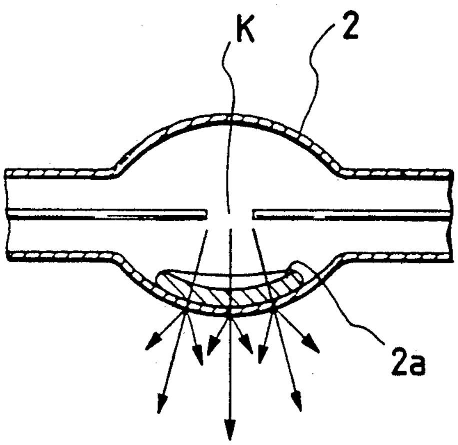

In FIG. 1, reference numeral 1 designates a reflector in which a metal halide discharge lamp bulb 2 is mounted. A front lens 3 is arranged over the front opening of the reflector 1. CL1 is the central axis of the lamp. CL2 is the central axis of the metal halide discharge lamp bulb 2 arranged so as to be inclined slightly rightward at an angle $\theta 1$ from the central axis CL1 of the lamp, and K, a light-emitting section of the metal halide discharge lamp bulb 2.

The reflecting surface of the reflector 1 is divided in two vertically, forming an upper reflecting surface 4 and a lower reflecting surface 5. Since the lower reflecting surface 5 falls within a range $\alpha$ of light which passes through metal halide sediment 2*a* of the metal halide discharge lamp bulb 2, which varies depending on the amount and condition of the metal halide sediment 2*a*, the lower reflecting surface 5 should be designed in accordance with the type of metal halide discharge lamp bulb 2 used. The lower reflecting surface 5 is divided into a left reflecting surface 5*a* and a right reflecting surface 5*b*. The left reflecting surface 5*a* is inclined by an angle $\theta 2$ rightward from the central axis CL2 of the metal halide discharge lamp bulb 2, whereas the right reflecting surface 5*b* by an angle $\theta 3$ leftward.

Also, the inner surface of the front lens 3 has, on the lower half portion thereof, diffusing lens steps 6 that diffuse reflected light rays L2, L3 from the left reflecting surface 5*a* and the right reflecting surface 5*b* in both left and right directions. Assuming that the diffusing angles are $\phi 2$ and $\phi 3$.

$$\phi 3=\theta 1+\theta 3, \text{ and}$$

$$\phi 2=\theta 2-\theta 1=\delta,$$

with $\delta$ typically being about 2° to 4°

However, $\phi \geqq \text{MIN}\ (\phi 2,\ \phi 3)$ in the diffusing lens steps 6 to which both light rays are injected.

Reference numerals 7 designate shades arranged on both sides of the metal halide discharge lamp bulb 2 at positions substantially from 90° to 105° (3:00 to 3:30) and from 255° to 270° (8:30 to 9:00) around the center axis CL1 and measured from the vertical so as to shade light rays in such ranges.

Figure 5:
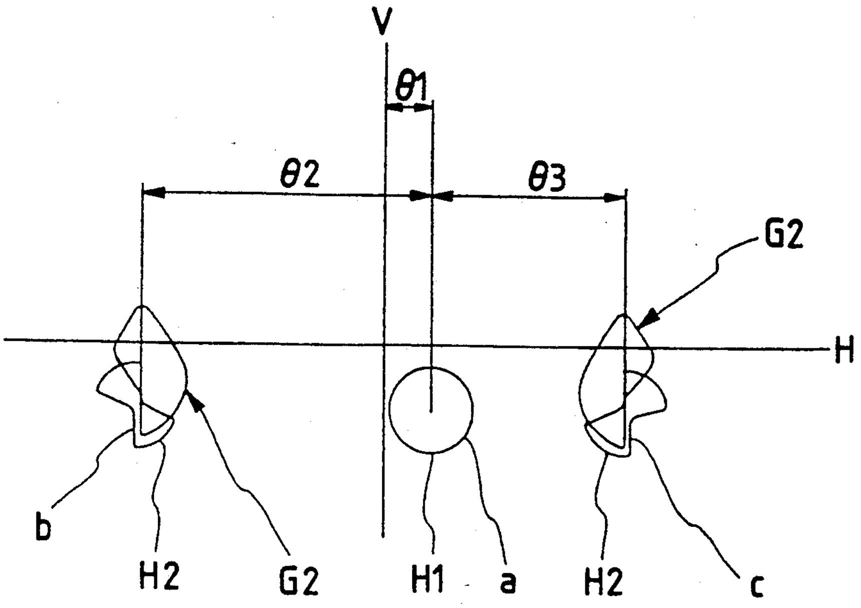
FIG. 5 is a diagram illustrative of light distribution patterns which would be produced by the headlamp without the front lens.
Figure 6:
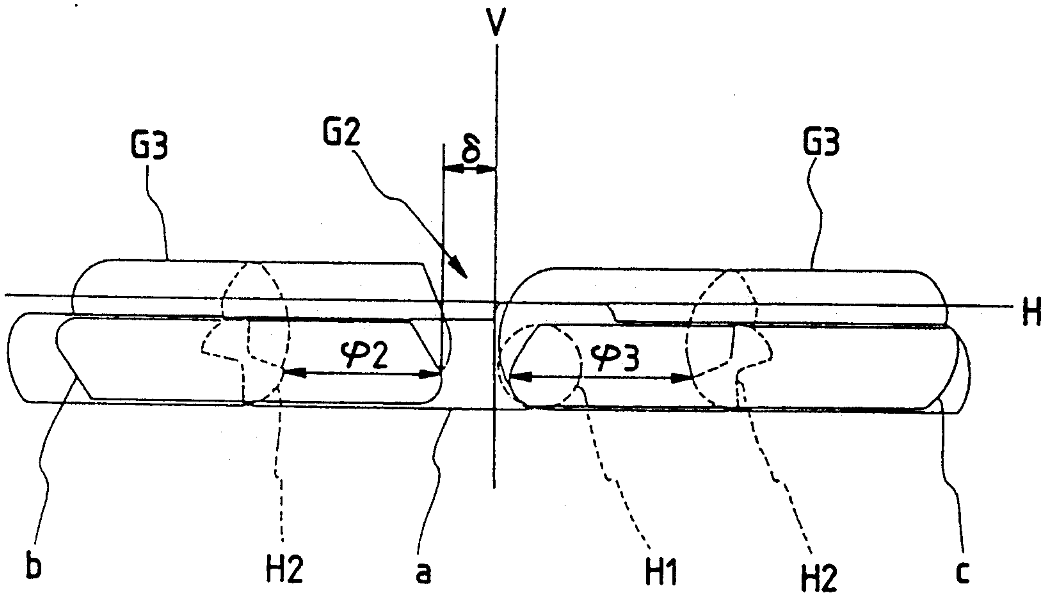
FIG. 6 is a diagram illustrative of light distribution patterns of a luminous flux having passed through the front lens.

Patterns on the screen of the thus-designed headlamp are as shown in FIGS. 5 and 6. FIG. 5 shows light distribution patterns formed by only the reflector 1 without the front lens 3, and FIG. 6 shows light distribution patterns formed by the reflector 1 with the front lens 3. A light distribution pattern a shown in FIG. 5 is formed by a light reflecting from the upper reflecting surface 4 of the reflector 1 shown in FIG. 3. Further, light distribution pattern b, c shown in FIG. 5 are formed by lights reflecting from the left and right reflecting surfaces 5(*a*) and 5(*b*), respectively, of the lower reflecting surface 5 shown in FIG. 3. As is apparent from these light distribution patterns:

(1) the amount of light required at the portion G3 to improve visibility can be obtained without increasing the amount of flaring light at the portion G2, as has been a problem in the conventional headlamp;

(2) the amount of light at the portion G3 can be adjusted by diffusing a pattern b vertically using the diffusing lens steps 6 of the front lens 3 without increasing the flaring light at the portion G2; and (3) the range $\delta$ at the portion G2 is preferably from 2° to 4°, although the range varies depending on the light condensing rates at hot zones H1 and H2, as well as on the structure of the metal halide discharge lamp bulb 2.

The above-described embodiment employs the shades 7. While the shades are not essential, an advantage provided by the shades is to achieve a headlamp with less flaring light at the portion G. For example, with reference to FIGS. 7(*a*) and 7(*b*), a case will be considered where a hot zone H1 of light distribution patterns is formed by portions a1 and a2 close to the portions shaded by the shades 7 on the upper reflecting surface 4 of the reflector 1.

Figure 7A:
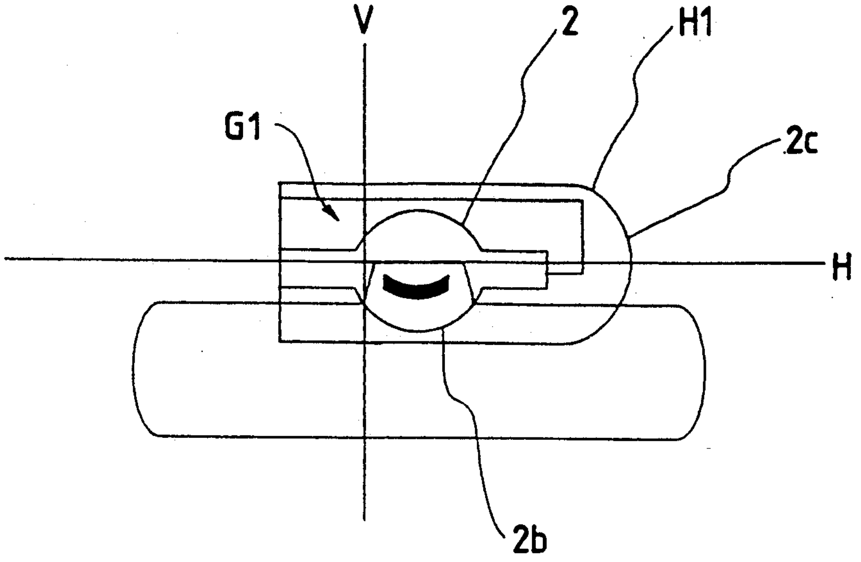
FIG. 7(*a*) is a diagram showing light distribution patterns produced by a lamp in the case where a "hot" zone is formed, and FIG. 7(*b*) is a diagram showing a light distribution pattern produced in the case where shades are provided.
Figure 7B:
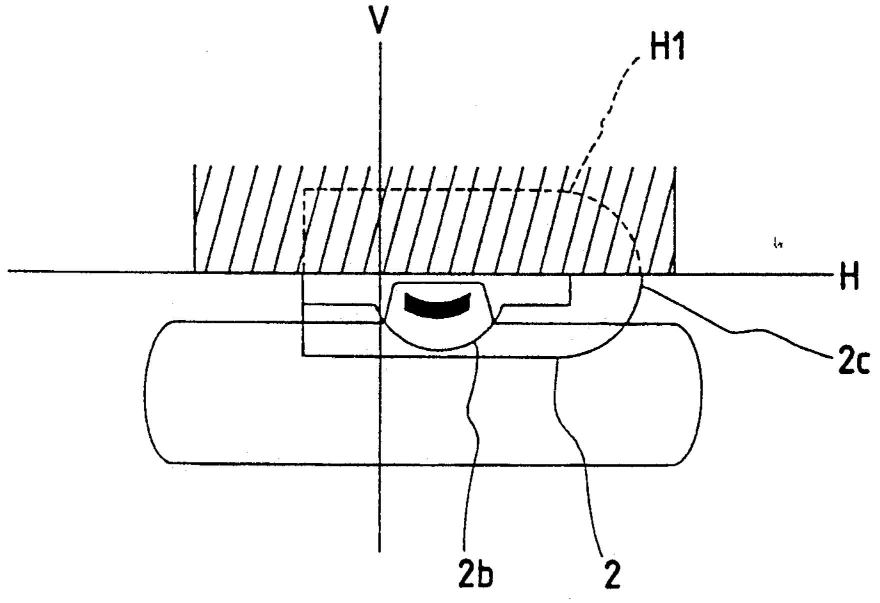
Figure 8A:
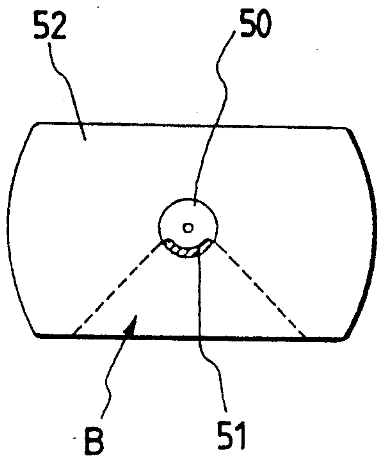
FIGS. 8(*a*) and 8(*b*) are respectively a front view of a lamp using a conventional metal halide discharge lamp bulb and a longitudinal sectional view thereof.
Figure 8B:
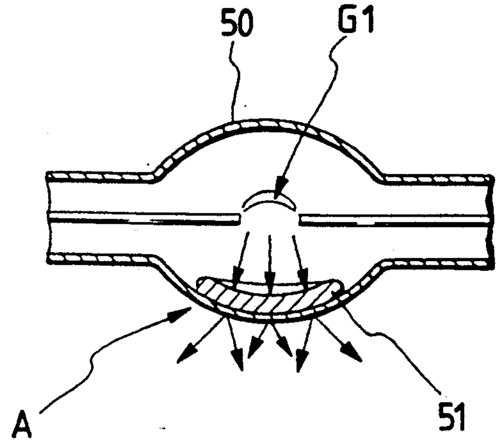
Figure 9:
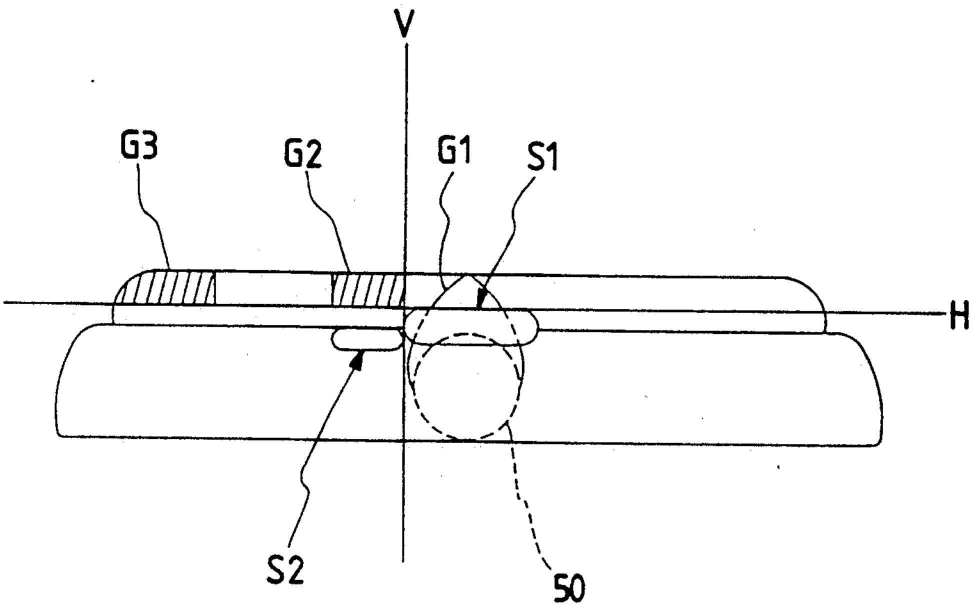
FIG. 9 is a diagram illustrative of light distribution patterns of the lamp shown in FIGS. 8(*a*) and 8(*b*).

(1) As shown in FIG. 7(*a*), portions of the structure of the metal halide discharge lamp bulb 2, including an arc tube 2*b* and an outer glass tube 2*c*, indirectly emit light, while receiving intense luminous flux from the discharge arc formed within the arc tube 2*b*. This causes flaring light at a portion G1.

(2) The flaring light is not objectionable as long as the brightness of the light source is not too high. If, on the other hand, the brightness of the light source is high, the intensity of the indirect light can be such that a problem is caused.

(3) When a metal halide discharge lamp bulb that provides a large amount of light is used, the shades 7 cut off the indirect light, as shown in FIG. 7(*b*), which is advantageous.

(4) By providing dividing lines L between the upper and lower reflecting surfaces 4 and 5 at the portions shaded by the shades 7, the scattering of light from the stepped structure of the reflector 1 at such divisions can be prevented.

If the shades 7 are not employed, a dark coating, such as a black coating, may be provided to prevent the scattering of light from the stepped structure of the reflector 1.

An embodiment in which the left reflecting surface 5*a* and the right reflecting surface 5*b* of the lower reflecting surface 5 are arranged so that the left reflecting surface 5*a* is inclined rightward from the central axis CL2 of the metal halide discharge lamp bulb 2 and the right reflecting surface 5*b* is inclined leftward therefrom is proposed. Similar light distribution patterns can be obtained by inclining the left reflecting mirror surface 5*a* leftward from the central axis CL2 of the metal halide discharge lamp bulb 2 and the right reflecting surface 5*b* rightward therefrom. However, in this case, the injected flux is directed outward viewed from the central axis CL1 of the lamp. As a result, the luminous fluxes from the upper reflecting surface 4 adjacent the left reflecting surface 5*a* and the right reflecting surface 5*b* are directed onto the same diffusing lens steps 6, thereby restricting the mutually required function of the diffusing lens steps. This makes the design of the diffusing lens steps difficult.

The lens steps 6 formed at the lower half of the front lens 3 can be arranged either inside or outside the lens surface. As an alternate arrangement, a light transmitting member on which the lens steps 6 are formed may arranged inside the lamp.

The automotive headlamp according to the invention is characterized in the above construction. That is, in a lamp having a metal halide discharge lamp bulb, a luminous flux scattered by metal halide sediment in the bulb is directed onto the diffusing lens steps of the front lens by reflecting a left-side luminous flux rightward and a right-side luminous flux leftward with the lower reflecting surface of the reflector. As a result, the upward scattered light can be cut off to eliminate flaring light which could blind the driver of an oncoming vehicle. In addition, the headlamp of the invention does not require the shading of all distributed light in the upper half portion over the horizon, thereby not only obtaining a certain amount of light, but also improving the visibility of obstacles in the upper part of the road.

What is claimed is:

1. In an automotive headlamp having a metal halide discharge lamp bulb as a light source provided in front of a reflector, the improvement wherein:

a reflecting surface of said reflector is divided into a lower reflecting surface and an upper reflecting surface, said lower reflecting surface being substantially a lower half portion of said reflecting surface of said reflector which receives a scattered flux attributable to metal halide sediments of said bulb, the upper reflecting surface being a substantially upper half portion of said reflecting surface of said reflector which receives a nonscattered flux, said lower reflecting surface being further divided into a right reflecting surface including a right half portion of said lower reflecting surface and a left reflecting surface including a left half portion of said lower reflecting surface, said right reflecting surface and said left reflecting surface being inclined at predetermined angles to reflect light fluxes therefrom in respective in left and right directions; and diffusing lens steps are formed over a predetermined range of a lower half portion of a front lens covering a front opening covering said reflector, said range being determined to diffuse each of said fluxes from said right reflecting surface and said left reflecting surface in both right and left directions.

2. The automotive headlamp of claim 1, further comprising a pair of shades arranged on respective sides of said metal halide discharge lamp bulb for shading light rays in predetermined ranges around said bulb.

3. The automotive headlamp of claim 2, wherein said shades respectively cover positions substantially from 90° to 105° and from 255° to 270° around a center axis of said headlamp and measured from a vertical line.

4. The automotive headlamp of claim 1, wherein a difference between said predetermined angles at which said right and left reflecting surfaces are inclined is in a range of 2° to 4°.

* * * * *